(12) United States Patent
Yang et al.

(10) Patent No.: US 10,104,148 B2
(45) Date of Patent: Oct. 16, 2018

(54) NANOSECOND ACCURACY UNDER PRECISION TIME PROTOCOL FOR ETHERNET BY USING HIGH ACCURACY TIMESTAMP ASSIST DEVICE

(71) Applicant: GLOBALFOUNDRIES INC., Grand Cayman (KY)

(72) Inventors: Kai Yang, Beijing (CN); Adrian Butter, Pittsburgh, PA (US); Bin Sun, Beijing (CN); Bin Yu, Beijing (CN)

(73) Assignee: GLOBALFOUNDRIES INC., Grand Cayman (KY)

( * ) Notice: Subject to any disclaimer, the term of this patent is extended or adjusted under 35 U.S.C. 154(b) by 113 days.

(21) Appl. No.: 15/397,028

(22) Filed: Jan. 3, 2017

(65) Prior Publication Data

US 2018/0191802 A1 Jul. 5, 2018

(51) Int. Cl.
*H04L 12/40* (2006.01)
*H04L 29/06* (2006.01)
*H04L 1/00* (2006.01)
*H04L 29/08* (2006.01)
*H04L 12/64* (2006.01)

(52) U.S. Cl.
CPC .......... *H04L 65/608* (2013.01); *H04L 1/0018* (2013.01); *H04L 69/323* (2013.01); *H04L 2012/6454* (2013.01)

(58) Field of Classification Search
CPC ........... H04L 12/40032; H04L 12/4013; H04L 25/14; H04J 3/0697; H04J 3/0667
USPC ................................. 375/211–215, 354–376
See application file for complete search history.

(56) References Cited

U.S. PATENT DOCUMENTS

| | | | |
|---|---|---|---|
| 6,512,990 B1 * | 1/2003 | Woods | G01R 19/2516 370/503 |
| 6,532,274 B1 * | 3/2003 | Ruffini | H04J 3/0664 375/356 |
| 6,751,573 B1 * | 6/2004 | Burch | G06F 11/0709 370/473 |
| 6,891,881 B2 * | 5/2005 | Trachewsky | H04L 1/0003 375/143 |
| 7,161,955 B1 | 1/2007 | Zeng et al. | |

(Continued)

OTHER PUBLICATIONS

Taiwan Application No. 106124111, Examination Report dated Jun. 15, 2018, pp. 1-11.

*Primary Examiner* — James M Perez
(74) *Attorney, Agent, or Firm* — Gibb & Riley, LLC; David A. Cain, Esq.

(57) ABSTRACT

In methods, systems, and devices, master and slave node timestamp synchronization units identify a node start frame delimiter of a time protocol message on transmission medium by matching patterns in the time protocol message to known start frame delimiter patterns. Master and slave node processors of such timestamp synchronization units capture a corresponding node clock time at which the node start frame delimiter is identified by referring to a corresponding node clock signal while each is identifying the node start frame delimiter. The master and slave node processors perform compensation of the node clock time by making adjustments to the node clock time for known time latency. The master and slave node timestamp synchronization units then output the node clock time as timestamps to corresponding timestamp units.

20 Claims, 9 Drawing Sheets

(56) References Cited

U.S. PATENT DOCUMENTS

| | | | |
|---|---|---|---|
| 7,689,854 B2* | 3/2010 | Ilnicki | H04J 3/0667 370/350 |
| 8,184,677 B1* | 5/2012 | McRobert | H04L 1/0002 375/213 |
| 8,223,648 B2* | 7/2012 | Zheng | H04J 3/0697 370/236.2 |
| 8,416,812 B2* | 4/2013 | Radulescu | H04J 3/0667 370/503 |
| 8,570,874 B2* | 10/2013 | Zheng | H04J 3/0697 370/236 |
| 8,630,315 B2 | 1/2014 | Rivaud et al. | |
| 8,982,974 B2* | 3/2015 | Bogdan | H03K 5/15013 375/260 |
| 9,001,951 B1* | 4/2015 | Kumpulainen | H04L 25/38 327/147 |
| 9,042,366 B2* | 5/2015 | Swartzentruber | H04L 41/147 370/350 |
| 9,300,421 B2* | 3/2016 | Yang | H04L 1/0042 |
| 9,602,271 B2* | 3/2017 | Benjamini | H04L 7/04 |
| 9,628,383 B2* | 4/2017 | Magee | H04L 12/413 |
| 2002/0061012 A1* | 5/2002 | Thi | H04B 3/23 370/352 |
| 2003/0016770 A1* | 1/2003 | Trans | H04B 1/00 375/346 |
| 2006/0072694 A1* | 4/2006 | Dai | H04J 3/0667 375/354 |
| 2006/0245454 A1* | 11/2006 | Balasubramanian | H04J 3/0673 370/509 |
| 2007/0008993 A1* | 1/2007 | Cha | H04J 3/0664 370/509 |
| 2008/0068989 A1* | 3/2008 | Wyk | G01D 4/004 370/229 |
| 2008/0137667 A1* | 6/2008 | Mohandas | H04L 12/1868 370/395.64 |
| 2009/0086766 A1 | 4/2009 | Gotz et al. | |
| 2009/0310726 A1* | 12/2009 | Alankry | H04J 3/0697 375/359 |
| 2010/0049964 A1* | 2/2010 | Kondapalli | H04L 63/0428 713/150 |
| 2011/0149779 A1* | 6/2011 | Richards | G01S 7/006 370/252 |
| 2011/0149998 A1* | 6/2011 | Thompson | H04J 3/0697 370/474 |
| 2011/0268161 A1* | 11/2011 | Yonge, III | H04L 12/413 375/211 |
| 2012/0014377 A1* | 1/2012 | Joergensen | H04L 43/0852 370/352 |
| 2012/0170597 A1 | 7/2012 | Stanton et al. | |
| 2012/0226801 A1* | 9/2012 | Velaga | H04L 67/1097 709/224 |
| 2012/0320933 A1* | 12/2012 | Magee | H04L 12/413 370/503 |
| 2013/0343409 A1* | 12/2013 | Haulin | H04J 3/0697 370/503 |
| 2014/0092918 A1* | 4/2014 | Jost | H04J 3/0661 370/465 |
| 2014/0177653 A1* | 6/2014 | Tzeng | H04J 3/0635 370/503 |
| 2014/0226984 A1 | 8/2014 | Roberts et al. | |
| 2015/0156009 A1* | 6/2015 | Bogdan | H04L 27/2601 375/376 |
| 2015/0280956 A1* | 10/2015 | Bogdan | H04L 27/2656 375/375 |
| 2016/0043823 A1* | 2/2016 | Zhao | H04J 3/0697 370/350 |
| 2016/0085479 A1* | 3/2016 | Edmiston | G06F 3/0659 711/154 |
| 2016/0352500 A1* | 12/2016 | Benjamini | H04L 7/04 |
| 2017/0168472 A1* | 6/2017 | Ando | G05B 19/042 |

* cited by examiner

NANOSECOND ACCURACY UNDER PRECISION TIME PROTOCOL FOR ETHERNET BY USING HIGH ACCURACY TIMESTAMP ASSIST DEVICE

FIELD OF THE INVENTION

The present relates to time synchronization in a distributed network using a standard for a Precision Clock Synchronization Protocol for Networked Measurement and Control Systems.

BACKGROUND

One exemplary standard discussed herein is the Precision Time Protocol (PTP), described by IEEE 1588-1008, which is a standard for synchronizing real-time clocks for communication among nodes of a distributed network. Such protocols enable accurate and precise synchronization of clocks in measurement and control systems using technologies such as network communication, local computing, and distributed objects. IEEE 1588 is a protocol for providing synchronization through exchange of packets over a network. The objective of hardware implement is high precision. Designing hardware that implements entire IEEE 1588 is rather complex.

The PTP is applicable to systems communicating by local area networks supporting multicast messaging, including Ethernet computer networking technologies. The PTP is designed for local area networks requiring accuracies beyond those attainable by a Network Time Protocol (NTP), which achieves accuracies of only one millisecond to tens of milliseconds.

IEEE 1588-1008 enables heterogeneous systems that include clocks of various inherent precisions, resolutions, and stabilities to synchronize to a master clock. IEEE 1588-1008 also supports system-wide synchronization accuracy in the sub-microsecond range with minimal network and local clock computing resources. IEEE 1588-1008 is appropriate for applications that cannot bear the cost of a GPS receiver at each synchronized node, or for which GPS signals are not accessible.

Measurement and control applications, requiring accurate timing and synchronization, increasingly employ distributed technologies such as network communication, local computing, and distributed objects. Many of these applications are enhanced by having an accurate and precise system-wide measurement of time achieved by having distributed local clocks in each sensor, actuator, or other system device. The improvement of the accuracy and the granularity (smallest visible time duration) of precision of these distributed local clocks in such systems is an active area of research.

SUMMARY

An exemplary timestamp synchronization unit includes (among other components) a processor internally electrically connected to various elements, including a clock connection, a timestamp unit connection, a time protocol decoder, etc. The clock connection is connected to an external clock signal control unit, and receives a clock signal from the external clock signal control unit. The timestamp unit connection is connected to an external timestamp unit, and the time protocol decoder is connected to transmission medium (e.g., Ethernet medium).

The time protocol decoder decodes a time protocol message as it is being transmitted on the transmission medium. The time protocol decoder is connected to the transmission medium through a physical layer. The physical layer includes a scrambler/descramber, and the time protocol decoder decodes the time protocol message in output from the scrambler/descramber.

The processor also identifies a start frame delimiter of the time protocol message by matching patterns in the time protocol message to known start frame delimiter patterns. The physical layer includes a serializer/deserializer, and the processor identifies the start frame delimiter in output from the serializer/deserializer.

The processor captures a clock time at which the start frame delimiter is identified by referring to the clock signal while identifying the start frame delimiter. The processor performs compensation of the clock time by making adjustments to the clock time for known time latency. The known time latency includes the sum of bit offsets of the serializer/deserializer combined with latency caused by traversing the timestamp synchronization unit. The processor outputs the compensated clock time as a timestamp to the timestamp unit through the timestamp unit connection.

The timestamp unit is connected to a medium access control device. The medium access control device provides the time protocol message to the timestamp unit, and the timestamp unit waits until the processor outputs the timestamp before outputting the same as its own timestamp.

A timestamp synchronization system herein uses the foregoing timestamp synchronization unit at various master and slave locations. Specifically, these systems include (among other components), a master node timestamp synchronization unit that is electrically connected to: transmission medium; a master node clock signal control unit generating a master node clock signal; a master node timestamp unit, etc. Each of the slave node timestamp synchronization units is similarly electrically connected to: the transmission medium; a slave node clock signal control unit generating a slave node clock signal; a slave node timestamp unit, etc.

The master node timestamp synchronization unit identifies a master node start frame delimiter of a time protocol message on the transmission medium by matching patterns in the time protocol message to known start frame delimiter patterns. The slave node timestamp synchronization unit identifies a slave node start frame delimiter of the time protocol message on the transmission medium by matching the patterns in the time protocol message to the known start frame delimiter patterns.

The master node timestamp synchronization unit captures a master node clock time at which the master node start frame delimiter is identified by referring to the master node clock signal while identifying the master node start frame delimiter. The slave node timestamp synchronization unit similarly captures a slave node clock time at which the slave node start frame delimiter is identified by referring to the slave node clock signal while identifying the slave node start frame delimiter.

More specifically, the master node timestamp synchronization unit and the slave node timestamp synchronization unit are connected to the transmission medium through a physical layer. The physical layer includes a scrambler/descramber, and the time protocol decoder decodes the time protocol message in output from the scrambler/descramber. The physical layer further includes a serializer/deserializer, and the timestamp synchronization units, identify the start frame delimiter in output from the serializer/deserializer.

The master node timestamp synchronization unit performs compensation of the master node clock time by making adjustments to the master node clock time for known time latency, and the slave node timestamp synchronization unit similarly performs compensation of the slave node clock time by making adjustments to the slave node clock time for the known time latency. This "known time latency" is the sum of the bit offsets of the serializer/deserializer combined with latency caused by traversing the synchronization units.

The master node timestamp synchronization unit outputs the master node clock time as a master node timestamp to the master node timestamp unit. Similarly, the slave node timestamp synchronization unit outputs the slave node clock time as a slave node timestamp to the slave node timestamp unit.

The master node timestamp synchronization unit is connected to a master node medium access control device 106. The slave node timestamp synchronization unit is also connected to a slave node medium access control device. The master node medium access control device 106 provides the time protocol message to the master node timestamp unit. The slave node medium access control device provides the time protocol message to the slave node timestamp unit. The master node timestamp unit waits until the master node timestamp synchronization unit outputs the timestamp before outputting the same as its own timestamp. The slave node timestamp unit similarly waits until the slave node timestamp synchronization unit outputs the timestamp before outputting the same as its own timestamp.

Various exemplary methods herein use a time protocol decoder of a timestamp synchronization unit to detect a time protocol message being transmitted on a transmission medium. The time protocol decoder is connected to the transmission medium through a physical layer, and the physical layer includes a scrambler/descrambler. The methods herein detect the time protocol message in output from the scrambler/descrambler. Also, these methods use a clock connection of the timestamp synchronization unit to receive a clock signal from an external clock signal control unit.

Thus, such methods can identify a start frame delimiter of the time protocol message (e.g., using a processor of the timestamp synchronization unit) by matching patterns in the time protocol message to known start frame delimiter patterns. The physical layer includes a serializer/deserializer, and these methods identify the start frame delimiter on output from the serializer/deserializer.

Additionally, these methods use the processor to capture a "clock time" at which the start frame delimiter is identified (e.g., by referring to the clock signal during the process of identifying the start frame delimiter).

Additionally, such methods perform compensation of the clock time by making adjustments to the clock time for known time latency, using the processor. This known time latency includes the sum of bit offsets of the serializer/deserializer combined with latency caused by traversing the synchronization unit. This allows the methods herein to output the compensated clock time from the timestamp synchronization unit to a timestamp unit, as a timestamp.

Further, the timestamp unit is connected to a medium access control device, and the medium access control device provides the time protocol message to the timestamp unit. With methods herein, the timestamp unit waits until the processor outputs the timestamp before outputting the same as its own timestamp.

BRIEF DESCRIPTION OF THE SEVERAL VIEWS OF THE DRAWINGS

The present will be better understood from the following detailed description with reference to the drawings, which are not necessarily drawn to scale and in which:

FIGS. 7A-8 are flow diagrams illustrating processing according to devices, systems, and methods herein.

DETAILED DESCRIPTION

Detailed embodiments are disclosed herein with reference to the accompanying drawings. It is to be understood that the disclosed embodiments are merely illustrative of potential embodiments and may take various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present embodiments. Additionally, while one specific standard protocol is discussed herein (IEEE 1588), those ordinarily skilled in the art would understand that the methods and devices discussed herein are applicable to all relevant standards and protocols that utilize timestamps.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As stated above, the improvement of the accuracy and granularity of precision of distributed local clocks in a network is an active area of research. Under the Precision Time Protocol (PTP), a master clock is used to synchronize other clocks, i.e., slave clocks, of a network. PTP messages are exchanged between the master clock and other local slave clocks, to synchronize the local slave clocks to the master clock, i.e., master time. The exchanged PTP messages may include: a Sync message and an optional Follow_Up message that transmit master time from the master clock to a slave clock; a Delay_req message transmitted from the slave clock to the master clock following receipt of the Sync message by the slave clock; and a Delay_resp message transmitted from the master clock to the slave clock following receipt of the Delay-req message by the master clock. This exchange of messages permits the calculation of an offset between the master clock and a slave clock, and the transmission delay between the master clock and the slave clock, when it is assumed that the transmission delay from the master clock to the slave clock is equal to the transmission delay from the slave clock to the master clock, i.e., the transmission delay between the master clock and the slave clock is symmetrical.

Figure 1:
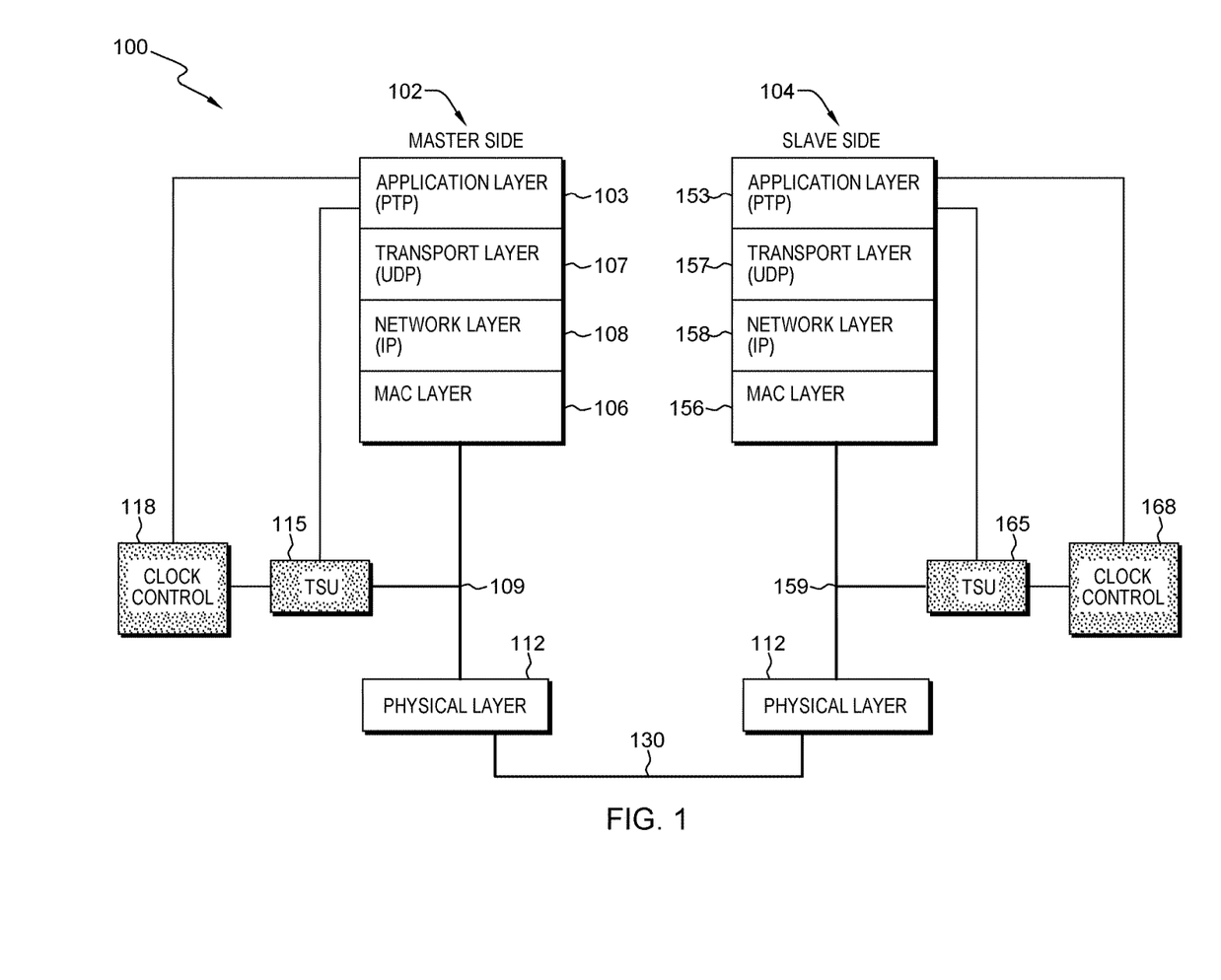
FIGS. 1 and 2 are schematic diagrams illustrating networks having master and slave nodes.

FIG. 1 illustrates a block diagram of a conventional network 100 that implements the PTP of IEEE 1588, using Open Systems Interconnection (OSI) conceptual model, which characterizes and standardizes the communication function of the distributed system without regard to its underlying internal structure and technology. Any of the Ethernet single lane protocols, 1G/10G/25G/50G/100G, can be implemented by the Physical Layers 112 of the master side and the slave side of the communication function.

In a PTP message, there will be a flow of data packets down through the layers of a transmit (TX) path, across the transmission medium and up through the layers of the receiver (RX) path. In the drawings, the master side is identified using number 102, and the slave side using number 104. For example, PTP information is provided from an Application Layer 103, or a Timestamp Unit (TSU) 115 connected to the master's Clock Control 118 to the Medium Access Control (MAC) Layer 106 in a transmit (TX) path. FIG. 1 additionally illustrates the transport layers (UDP) 107, 157, and the network layers (IP) 108, 158 in the master and slave nodes 102, 104. The MAC Layer 106 reports the PTP information to the Timestamp Unit (TSU) 115, which being in communication with Clock Control 118, generates a master's timestamp. In the transmit (TX) path, the master's timestamp is incorporated into the PTP message and transmitted from the MAC Layer 106 to the Physical Layer 112 at the Medium Independent Interface (MII) 109. The Physical Layer 112, with its physical layers of EtherNet Internet Protocols (IPs), then transmits Ethernet frames containing the PTP message with the master's timestamp through a transmission medium 130, e.g., copper wire, optic fiber, or radio waves, to the slave side. In the receiver (RX) path, the PTP message, contained in the transmitted Ethernet frames from the distributed network to the slave side Application Layer 153, is received by Physical Layer 112 of the slave side with its physical layers of EtherNet IPs and sent upward to the slave side's MAC layer 156 at the Medium Independent Interface (MII) 159, where receipt of the PTP message is reported to the slave side's TSU 165, which being in communication with the slave side's Clock Control 168, generates a slave side's timestamp. The distributed network node's timestamp received by the slave's MAC Layer 156 and the slave side's timestamp generated by the slave's TSU 165 are then used to facilitate clock synchronization of the distributed network node's clock control 168 with that of the master side's clock control 118, according to the Precision Time Protocol (PTP).

With the implementation of the PTP, described above, is that any time spent traversing the Physical Layer by a PTP message in either the transmit path (TX) or the receiver path (RX) is not captured, because the timestamp is captured only at the Medium Independent Interface (109, 159) by the MAC layer (106, 156) clock and does not include the latency of the PTP message traversing the Physical Layer 112 with its EtherNet IPs. In addition, the latency of the PTP message traversing the Physical Layer 112 in both transmit (TX) and receiver (RX) paths is variable, further causing a problem.

For example, the transmit path (TX) of PTP messages traversing the Physical Layer 112 may require EtherNet IPs, such as, encoding eight octets (64-bits) from the Medium Independent Interface (109, 159) into a single 66-bit block used by a Physical Coding Sublayer (PCS); further transcoding the 66-bit block for Forward Error Correction (FEC); scrambling the encoded 66-bit block in the PCS; converting, by a gearbox in a Physical Medium Attachment Sublayer (PMA), the signals between the 66-bit width used by the PCS to smaller bit-widths used by multiple Serializer/Deserializers (SerDes) of a Physical Medium Dependent Sublayer (PMD); distributing, by the gearbox, the 66-bit blocks to the multiple SerDes; and inserting, by the gearbox, alignment markers for transmission by the SerDes.

While, for example, receiving of PTP messages in the receiver (RX) path may require: decoding 66-bit blocks from the gearbox or, after FEC transcoding and error correction from the FEC block, decoding the block into eight octets in the PCS; descrambling the scrambled encoded 66-bit block in the PCS; and re-ordering, by the gearbox in the PMA, the received 66-bit blocks from the SerDes of the PMD and removing the alignment markers. This variability of latency for the PTP messages being processed by the EtherNet IPs of the Physical Layer in both transmit (TX) and receiver (RX) paths precludes an accuracy and precision of one nanosecond or less for the capture of timestamps.

Figure 2:
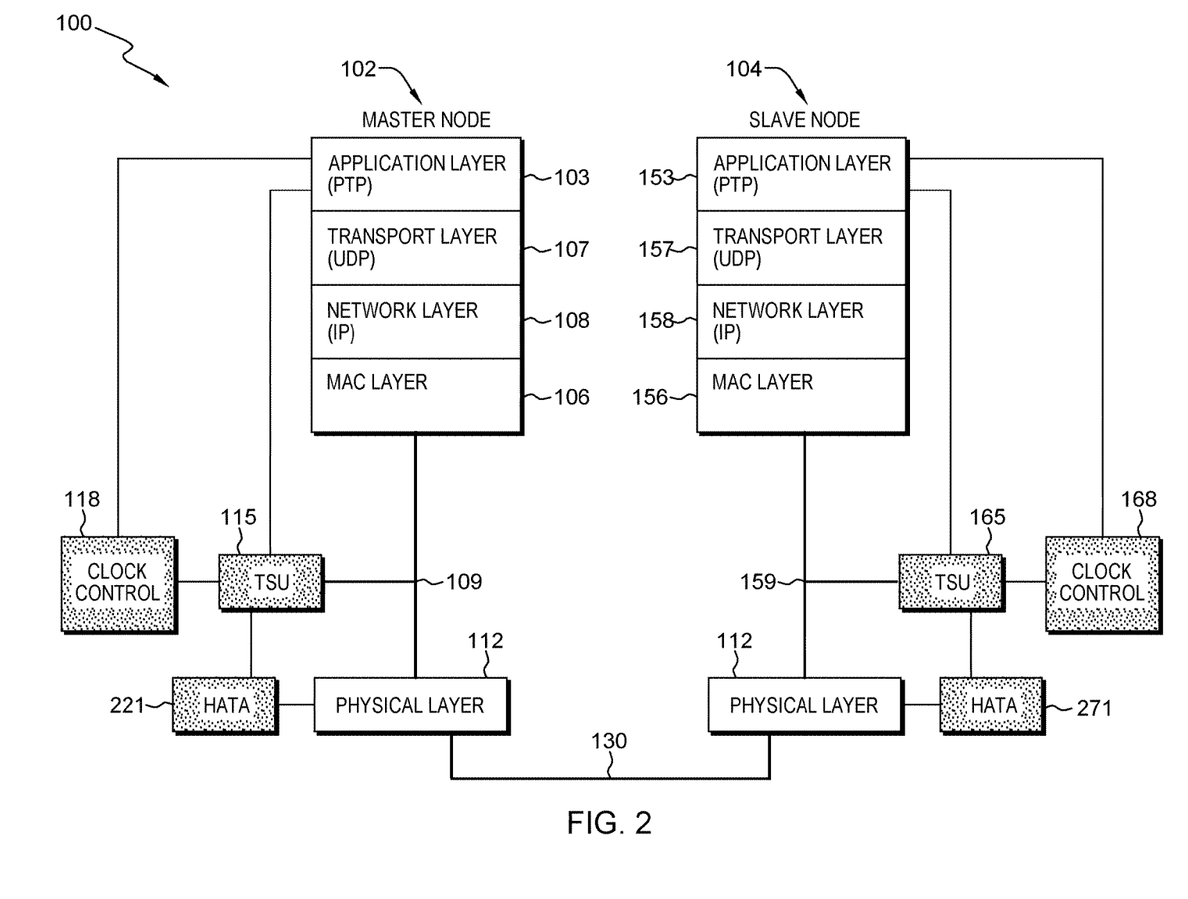

Illustrated in FIG. 2, are high accuracy timestamp assist (HATA) devices 221, 271 connect to the Physical Layers 112, Timestamp Units (TSU) 115, 165 and the Clock Controls 118, 168 of the master side and the slave side, respectively, in a distributed network that implements EtherNet IPs. The HATA devices 221, 271 are sometimes referred to herein as "timestamp synchronization units" and provide a method of capturing the departure and arrival times of PTP messages on both transmit and receiver paths that includes the time traversing Physical Layers 112 with their EtherNet IPs, to achieve nanosecond accuracy and precision under the IEEE Standard for a Precision Clock Synchronization Protocol for Networked Measurement and Control Systems, i.e., IEEE 1588-1008.

For transmission by the master side 102 of a node of a distributed network of an exemplary embodiment, the HATA 221 device processes PTP information arriving at the MAC Layer 106 from the TSU 115 or other application block. The MAC Layer 106 then reports the PTP message to the TSU 115. The TSU 115 waits to get the timestamp for the PTP message from HATA device 221. Meanwhile, the HATA device 221 detects a scrambled Start Frame Delimiter (SFD) pattern of a PTP message traversing the Physical Layer 112 by a SFD Pattern Detector contained within the HATA device 221. The HATA device 221 captures the departure time of the scrambled SFD bit pattern of the PTP message from the Physical Layer 112, just before transmission over the external transmission medium 130, and generates a timestamp of the captured departure time. The HATA-generated timestamp, corresponding to the captured departure time, is then transmitted to the TSU 115 for processing of the PTP message, and subsequent transmission over transmission medium 130.

FIG. 2, also shows for receiving by slave side 104, the high accuracy timestamp assist (HATA) device 271 continuously searches for a scrambled Start Frame Delimiter (SFD) bit pattern arriving from the transmission medium 130. The MAC layer 156 reports receiving the PTP message to the Timestamp Unit (TSU) 165. The TSU 165 waits to get the timestamp from the HATA device 271. The HATA device 271 asserts of a Forward Error Correction signal, FEC_CONFIG_STS, relative to the continuously received data, RX_HSS_DATA_IN, which is stored in a FIFO memory block 530, to estimate the latency of the received SFD pattern to the Physical Layer 112. The HATA device 271 captures the arrival time of the scrambled SFD bit pattern, just after receiving the scrambled SFD bit pattern at the SerDes interface of the Physical Layer 112 and generates a timestamp of the captured arrival time. The HATA-generated timestamp, corresponding to the captured arrival time, is then transmitted to the TSU 165 to further clock synchronization between a master side and a slave side of the communication device.

Figure 3:
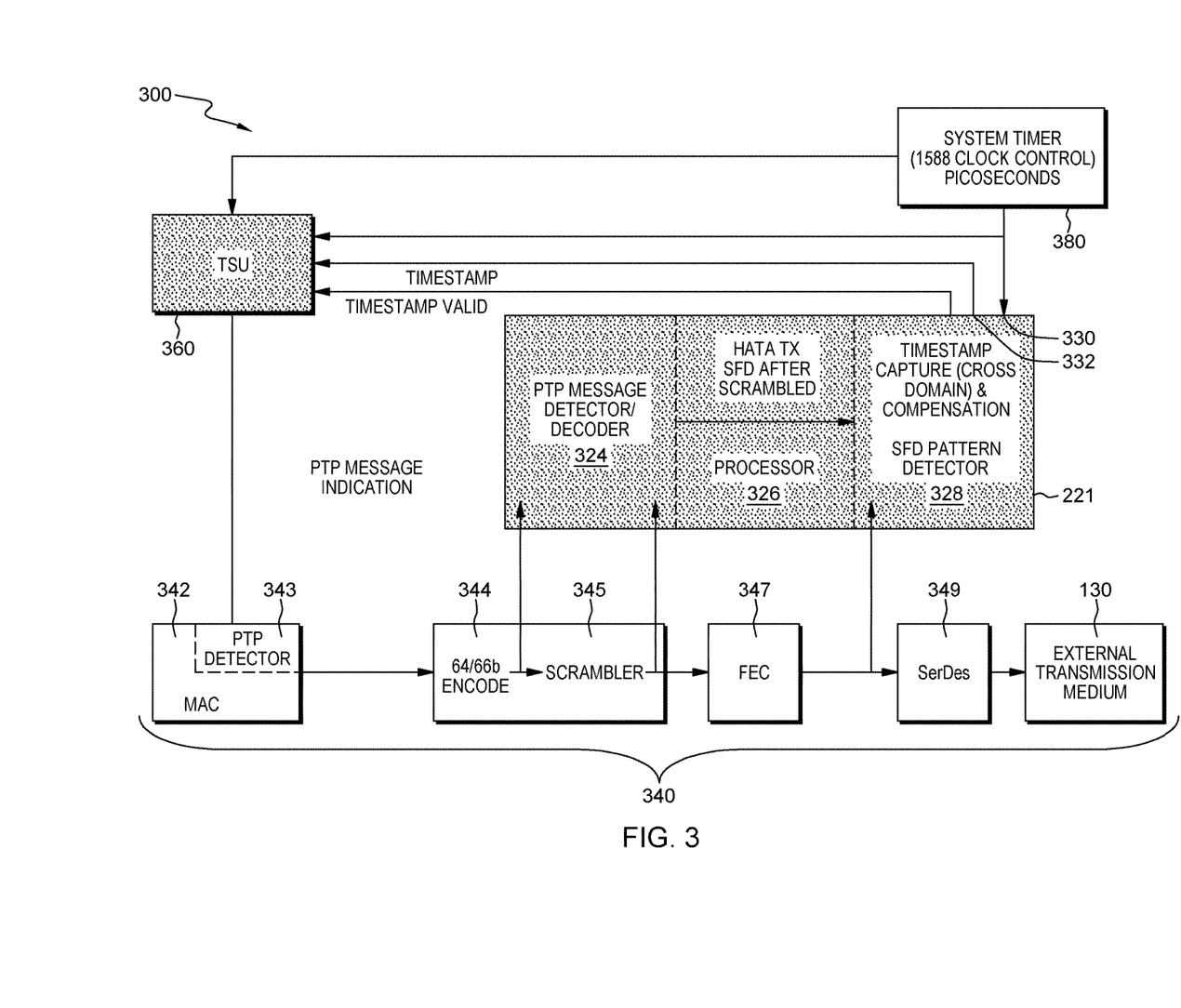
FIG. 3 is a schematic diagram illustrating a portion of the network shown in FIGS. 1 and 2.

FIG. 3 illustrates a more detailed description of an exemplary transmit (TX) path 300 of the embodiments herein including a high accuracy timestamp assist (HATA) device 221, Ethernet components 340, a Timestamp Unit (TSU) 360, a System Timer 380, a forward error correction (FEC) sublayer 347, etc. A PTP detector 343 of the MAC layer 342 detects arrival of a PTP message in the TX path and signals the TSU 360, which is connected to the System Timer 380. Timestamp generation by the TSU 360 is held in abeyance until timestamp compensation is received from the HATA device 221. The HATA device 221 includes a PTP Message Detector 324 that detects a Start Frame Delimiter (SFD) pattern, i.e., 32'h55_55_55_D5, and Ethernet TYPE for a PTP message, 16'h88_F7, from a scrambler 345 of a Physical Coding Sublayer (PCS) of the Physical Layer's Ethernet components 342. The scrambled SFD bit pattern is then reported to the SFD Pattern Detector 328 of the HATA device 221. The SFD Pattern Detector 328 searches for the scrambled SFD bit pattern from the datastream of the Serializer/Deserializer (SerDes) interface 349 of the Ethernet components 340, i.e., just before transmission over the external transmission medium, captures the time of detecting the scrambled SFD bit pattern by the SFD Pattern Detector 328, and signals the Timestamp Unit 360, which is connected to the System Timer 380. The captured time of detecting the scrambled SFD bit pattern, following Ethernet IP processing in the Physical Layer, is then used to compensate for the departure time of the PTP message in the transmit (TX) path.

Since the start bit of the SFD bit pattern may appear at any bit position of the SerDes interface, a 32 bit comparison block is used to find the start position of the SFD by the SFD Pattern Detector 328. Once the SFD bit pattern is detected, the SFD bit pattern detection is asserted to the TSU 360. A synchronizer may be used to convert this assertion to the system clock domain provided by the System Timer 380 to the TSU 360, because the System Timer 380 may not be synchronized to the SerDes clock domain.

Figure 4:
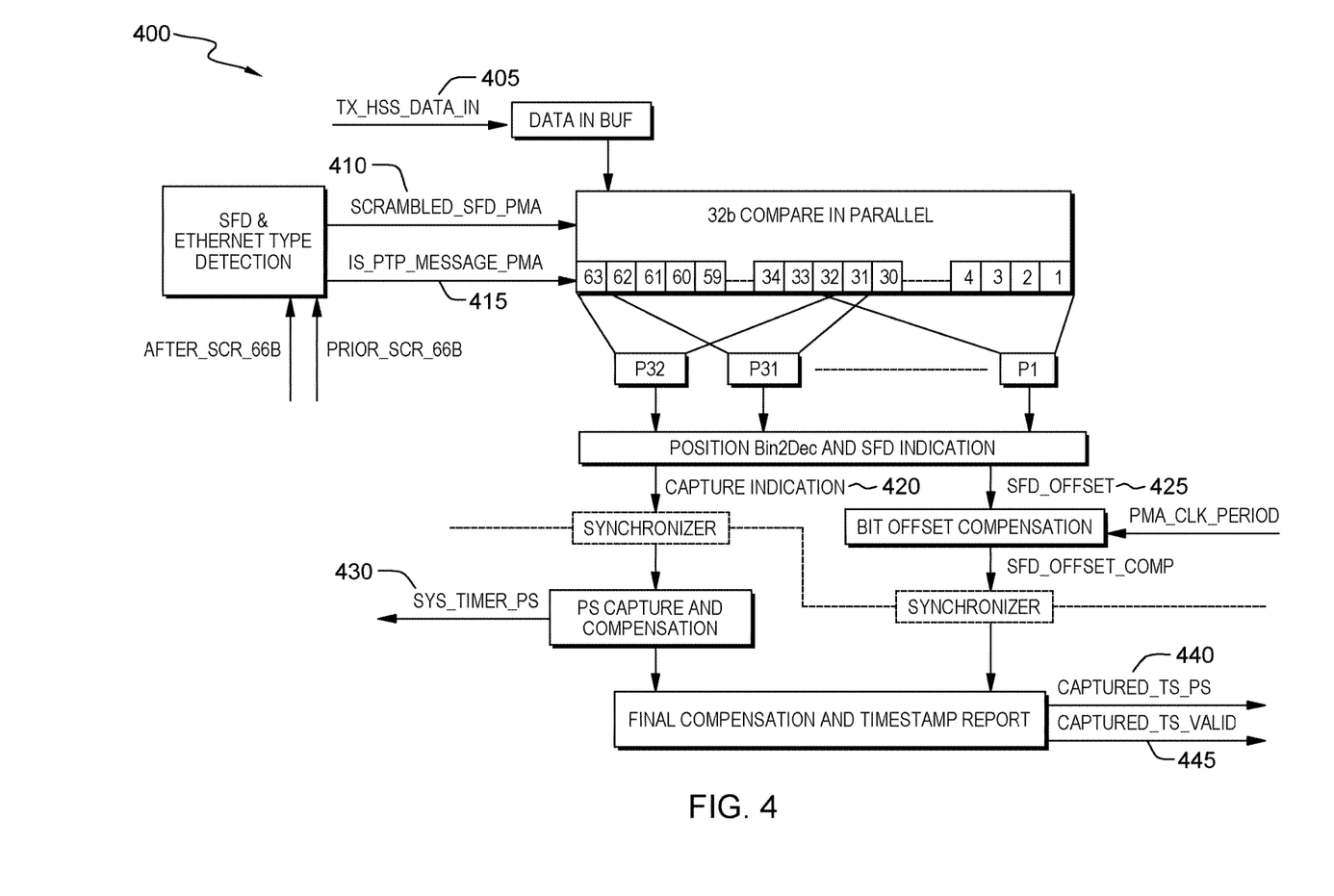
FIG. 4 is a schematic diagram illustrating signal processing according to devices, systems, and methods herein.

FIG. 4 illustrates signal flows 400 in a transmit (TX) path between the high accuracy timestamp assist (HATA) device 221, the Ethernet components 340, the Timestamp Unit (TSU) 360, and the System Timer 380 in an exemplary embodiment. Encoded PTP data, TX_HSS_DATA_IN 405, received from the Encoder's 344 interface, is stored in a data buffer and compared in parallel to, SCRAMBLED_SFD_PMA 410 and IS_PTP_MESSAGE_PMA 415, in order to assert a departure time capture 420 and a Start Frame Delimiter (SFD) offset, i.e., sfd_offset 425, respectively, in the Physical Medium Attachment (PMA) Sublayer of the Ethernet components 340. Once the SFD indication is asserted, a synchronizer may be used to convert the timestamp capture indication 420 to the system clock domain, SYS_TIMER_PS 430, where SYS_TIMER_PS 430 is a 40 bit-width free running timer for picoseconds, according to IEEE 1588-1008. The time skew caused by the sfd_offset 425 relative to the TX_HSS_DATA IN 405 may be provided by a Bit Offset Compensation, which is connected to the PMA_CLK_PERIOD 435. The time skew caused by synchronizing the timestamp capture indication 420 may be compensated by the Picosecond (PS) Capture and Compensation, which receives input from the SYS_TIMER_PS 430. Finally, the latency caused by traversing the HATA device 340 may be compensated by the Final Compensation and Timestamp report, which is transmitted from the HATA device 340 to the Timestamp Unit 360, via the CAPTURED_TS_PS 440 and CAPTURED_TS_VALID 445 signals.

Figure 5:
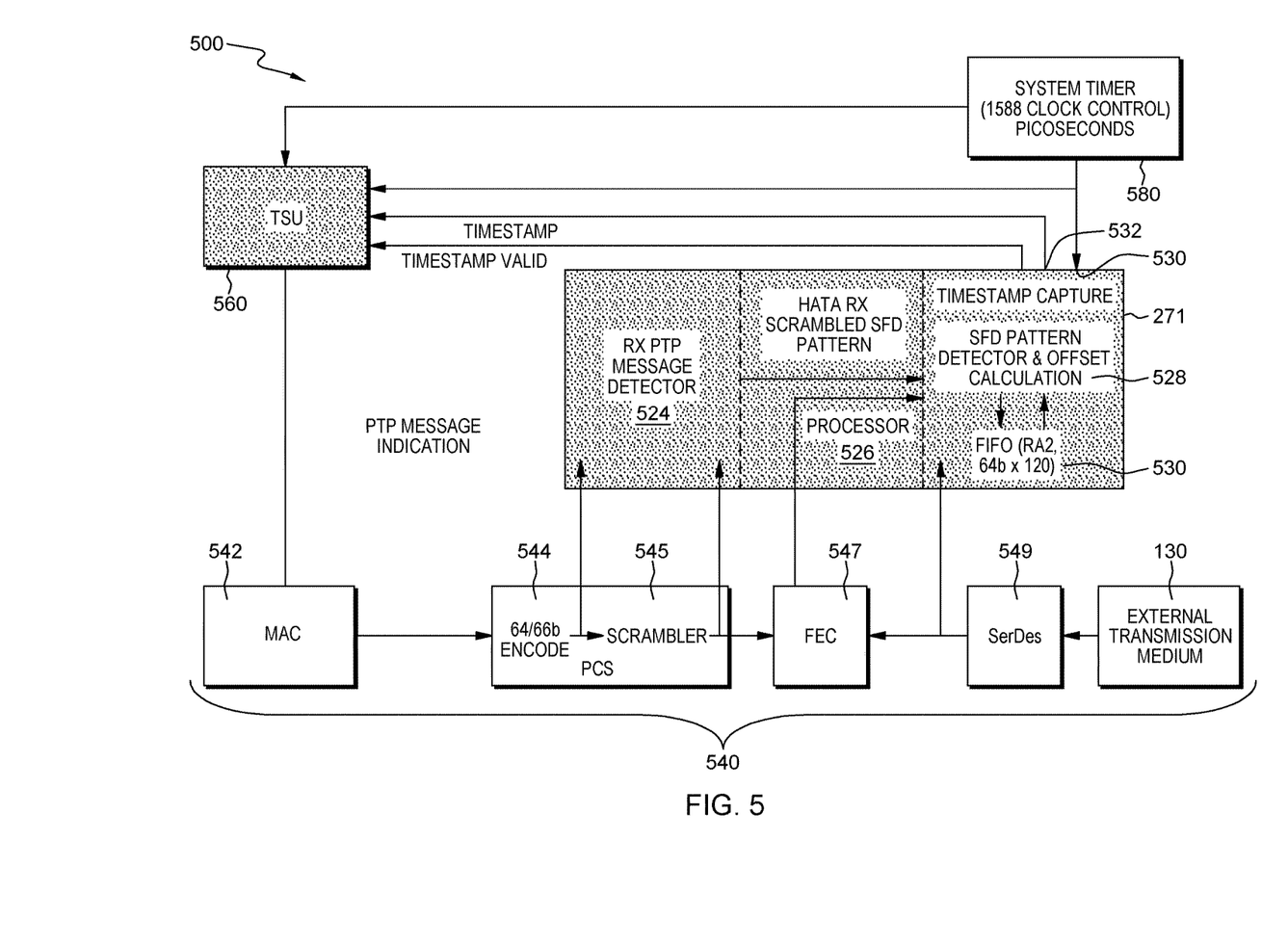
FIG. 5 is a schematic diagram illustrating a portion of the network shown in FIGS. 1 and 2.

FIG. 5 illustrates a more detailed description of an exemplary receiver (RX) path 500 of the embodiments herein including a high accuracy timestamp assist (HATA) device 271, Ethernet components 540, a Timestamp Unit (TSU) 560, and a System Timer 580. The HATA device 271 continuously searches for the scrambled SFD bit pattern arriving at the SerDes interface 549 from the external transmission medium. To detect the scrambled SFD bit pattern as soon as possible, the data packets received by the SerDes interface are written to a FIFO memory 530. Searching the FIFO entries for the scrambled SFD bit pattern may be based on an estimated latency of traversing the Ethernet IPs 540 of the Physical Layer. Since the start bit of the scrambled SFD bit pattern of the PTP message may appear at any bit position of the SerDes interface, a 32 bit comparison block is used to find the start position of the scrambled SFD bit pattern by the SFD Pattern Detector 528 (which may be the same as that of the SFD Pattern Detector 328 in FIG. 3) read from every FIFO entry 530. Time compensation is achieved by determining a difference between FIFO pointers for reading the FIFO entry in the FIFO memory 530, which contains the scrambled SFD bit pattern and corresponds to the arrival time of the PTP message just after traversing the SerDes interface 549 from the external transmission medium, and for writing this FIFO entry to the SFD Pattern Detector 528, which corresponds to time required to traverse the SerDes interface 549.

Figure 6:
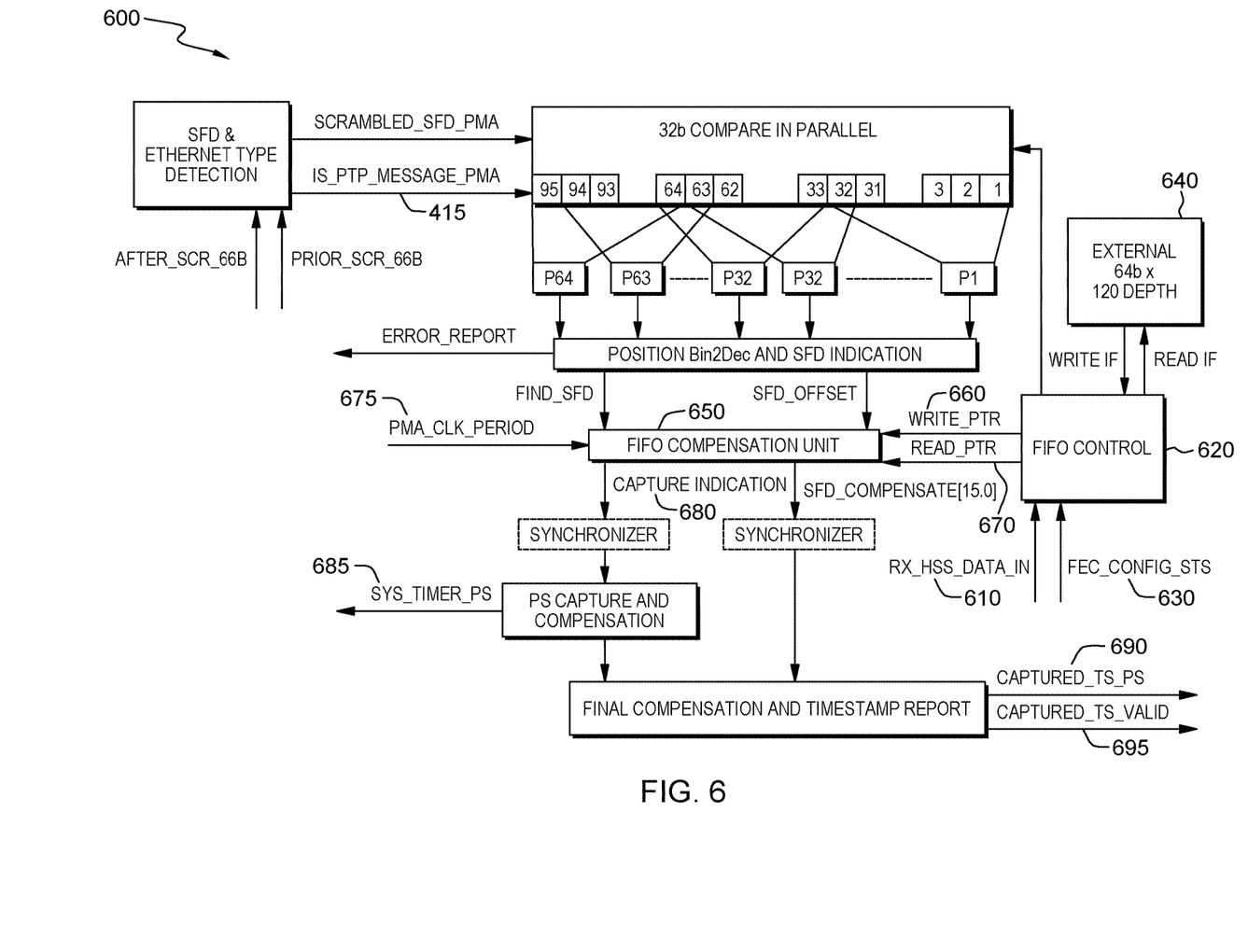
FIG. 6 is a schematic diagram illustrating signal processing according to devices, systems, and methods herein.

FIG. 6 illustrates signal flows 600 in a receiver (RX) path between the Ethernet components 540, the high accuracy timestamp assist (HATA) device 271, the Timestamp Unit (TSU) 560, and the System Timer 580 in an exemplary embodiment. To find the SFD pattern of a PTP message in the receiver data signal, RX_HSS_DATA_IN 610, to the HATA device, as soon as possible, the FIFO control block 620 estimates the latency to the Physical Layer by the input signal, FEC_CONFIG_STS 630, from the Ethernet protocol for Forward Error Correction (FEC) 547. Since the start bit of the SFD pattern for a PTP message may appear an any bit position of the SerDes interface 549, a 32 bit comparator, i.e., the SFD Pattern Detector 528 is used to detect the start position of the SFD from every FIFO entry to the FIFO memory 640. Once the SFD is detected, a FIFO Compensation Unit 650 uses the time difference between the writing 660 of the FIFO entry, containing the SFD, to the FIFO memory 640 and the reading 670 of the FIFO entry, containing the SFD, to the SFD Pattern Detector 528, to calculate how many clock cycles, provided by the PMA_CLK_Period 675, are required for the SFD to traverse the SerDes Interface 549 to the Ethernet protocol block for Forward Error Correction among the Ethernet protocols of the Physical Layer. The time skew caused by the sfd_offset relative to the RX_HSS_DATA IN 610 may be provided by a Bit Offset Compensation, which is connected to the PMA_CLK_PERIOD 675. The time skew caused by synchronizing the timestamp capture indication 680 may be compensated by the Picosecond (PS) Capture and Compensation, which receives input from the SYS_TIMER_PS 685. Finally, the latency caused by traversing the HATA device 271 may be compensated by the Final Compensation and Timestamp report, which is transmitted from the HATA device 271 to the Timestamp Unit 560, via the CAPTURED_TS_PS 690 and CAPTURED_TS_VALID 695 signals.

Thus, as shown in the previously discussed drawings, an exemplary timestamp synchronization unit 221, 271 includes (among other components) a processor 326, 526 internally electrically connected to various elements, including a clock connection 330, 530, a timestamp unit connection 332, 532, a time protocol decoder 324, 524, etc. Note that in the drawings, some wiring is not shown to avoid clutter. The clock connection 330, 530 is connected to an external clock signal control unit 380, and receives a clock signal from the external clock signal control unit 380. The timestamp unit connection 332, 532 is connected to an external timestamp unit 360, 560, and the time protocol decoder 324, 524 is connected to transmission medium (e.g., Ethernet medium, etc.) 130.

As shown, the time protocol decoder 324, 524 is connected to the transmission medium 130 through the physical layer 112. The time protocol decoder 324, 524 decodes a time protocol message as it is being transmitted on the transmission medium 130. The physical layer 112 includes an encoder 544, a scrambler/descramer 345, 545, and the time protocol decoder 324, 524 decodes the time protocol message in output from the scrambler/descramer 345, 545.

The processor 326, 526 also identifies a start frame delimiter of the time protocol message by matching patterns in the time protocol message to known start frame delimiter patterns. The physical layer 112 includes a serializer/deserializer 349, 549, and the processor 326, 526 identifies the start frame delimiter in output from the serializer/deserializer 349, 549.

The processor 326, 526 captures a clock time at which the start frame delimiter is identified by referring to the clock signal while identifying the start frame delimiter. The processor 326, 526 performs compensation of the clock time by making adjustments to the clock time for known time latency. This known time latency is the sum of bit offsets of the serializer/deserializer 349, 549 combined with latency caused by traversing the timestamp synchronization unit 221. The processor 326, 526 outputs the compensated clock time as a timestamp to the timestamp unit 360, 560 through the timestamp unit 360, 560 connection.

The timestamp unit 360, 560 is connected to a medium access control device. The medium access control device provides the time protocol message to the timestamp unit 360, 560, and the timestamp unit 360, 560 waits until the processor 326, 526 outputs the timestamp before outputting the same as its own timestamp.

Additionally, timestamp synchronization systems herein use the timestamp synchronization units 221, 271 at various master 102 and slave 104 locations. Specifically, these systems include (among other components), a master node timestamp synchronization unit 221 that is electrically connected to: transmission medium 130; a master node clock signal control unit 118 generating a master node clock signal; a master node timestamp unit 115, etc. Each of the slave node timestamp synchronization units 221 is similarly electrically connected to: the transmission medium 130; a slave node clock signal control unit 168 generating a slave node clock signal; a slave node timestamp unit 165, etc.

The master node timestamp synchronization unit 221 identifies a master node start frame delimiter of a time protocol message on the transmission medium 130 by matching patterns in the time protocol message to known start frame delimiter patterns. The slave node timestamp synchronization unit 221 identifies a slave node start frame delimiter of the time protocol message on the transmission medium 130 by matching the patterns in the time protocol message to the known start frame delimiter patterns.

The master node timestamp synchronization unit 221 captures a master node clock time at which the master node start frame delimiter is identified by referring to the master node clock signal while identifying the master node start frame delimiter. The slave node timestamp synchronization unit 271 similarly captures a slave node clock time at which the slave node start frame delimiter is identified by referring to the slave node clock signal while identifying the slave node start frame delimiter.

More specifically, the master node timestamp synchronization unit 221 and the slave node timestamp synchronization unit 271 are connected to the transmission medium 130 through a physical layer 112. The physical layer 112 includes a scrambler/descramer 345, 545, and the time protocol decoder 324, 524 decodes the time protocol message in output from the scrambler/descramer 345, 545. The physical layer 112 further includes a serializer/deserializer 349, 549, and the timestamp synchronization units 221, 271 identify the start frame delimiter in output from the serializer/deserializer 349, 549.

The master node timestamp synchronization unit 221 performs compensation of the master node clock time by making adjustments to the master node clock time for known time latency, and the slave node timestamp synchronization unit 271 similarly performs compensation of the slave node clock time by making adjustments to the slave node clock time for the known time latency. This "known time latency" is the sum of the bit offsets of the serializer/deserializer 349, 549 combined with latency caused by traversing the synchronization units 221, 271 and can be found empirically.

The master node timestamp synchronization unit 221 outputs the master node clock time as a master node timestamp to the master node timestamp unit 115. Similarly, the slave node timestamp synchronization unit 271 outputs the slave node clock time as a slave node timestamp to the slave node timestamp unit 165.

The master node timestamp synchronization unit 221 is connected to a master node medium access control device 106. The slave node timestamp synchronization unit 271 is also connected to a slave node medium access control device 156. The master node medium access control device 106 provides the time protocol message to the master node timestamp unit 115. The slave node medium access control device 156 provides the time protocol message to the slave node timestamp unit 165. The master node timestamp unit 115 waits until the master node timestamp synchronization unit 221 outputs the timestamp before outputting the same as its own timestamp. The slave node timestamp unit 165 similarly waits until the slave node timestamp synchronization unit 271 outputs the timestamp before outputting the same as its own timestamp.

Figure 7A:
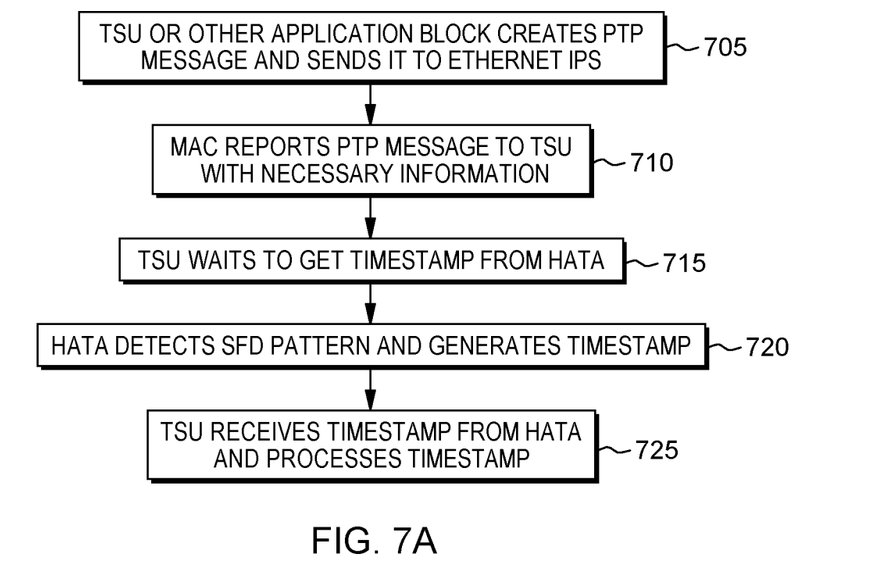
Figure 7B:
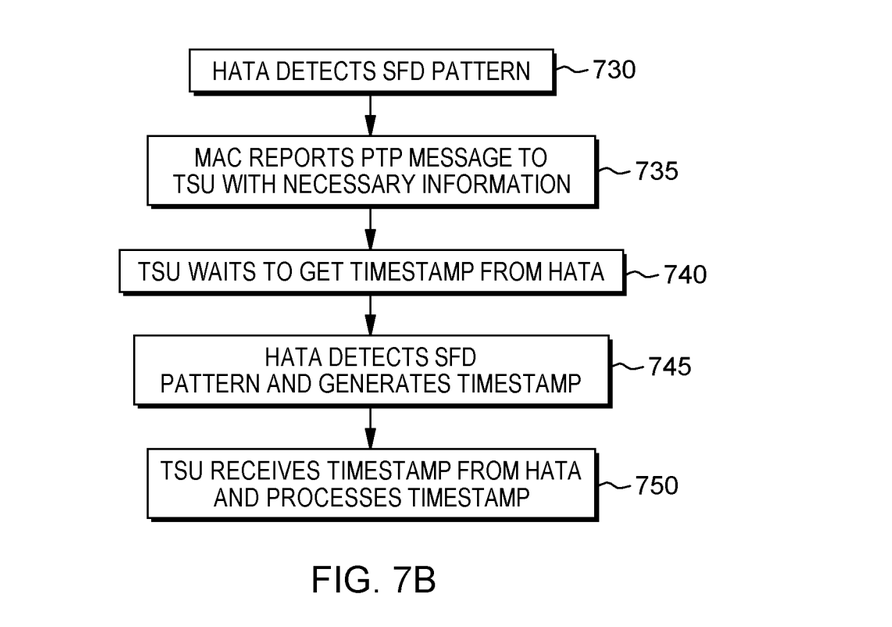
Figure 8:
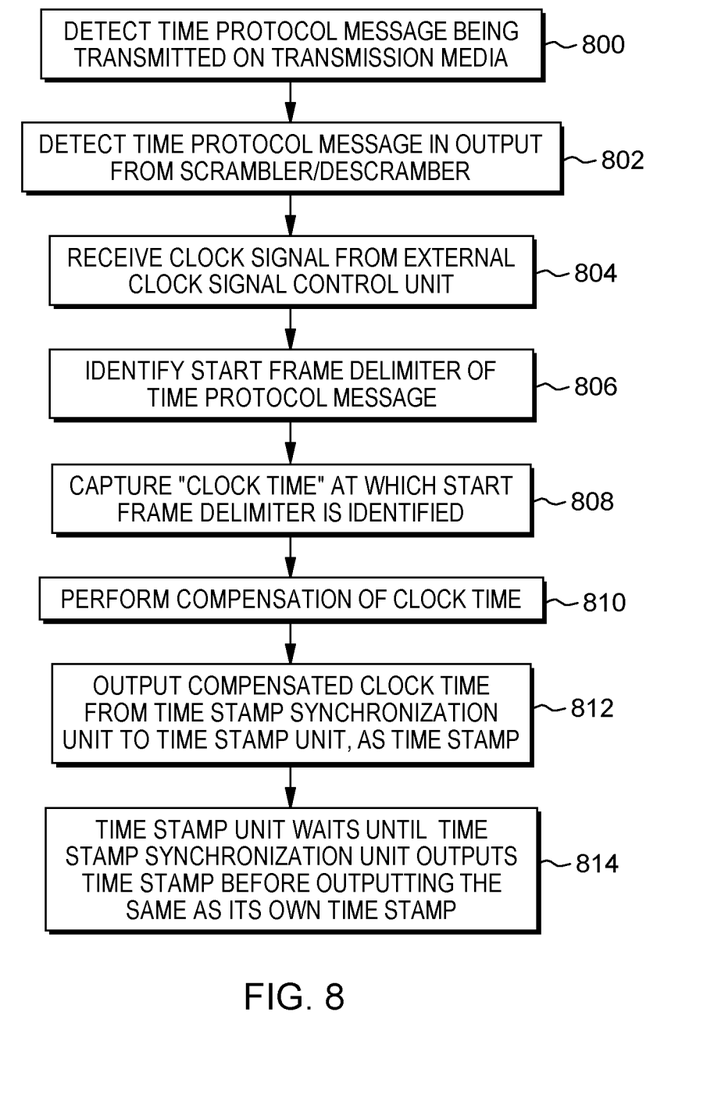

FIGS. 7A-8 illustrate methods of generating a timestamp using a Start Frame Delimiter (SFD) of a Precision Time Protocol (PTP) message, in a transmission path (FIG. 7A) and a receiving path (FIG. 7B).

In the transmission path (TX) shown in FIG. 7A, a Timestamp Unit (TSU) or other application block creates a Precision Time Protocol (PTP) message and sends it to Ethernet Internet Protocols (IPs), as shown in item 705. Next, as shown in item 710, a Medium Access Control (MAC) device reports the PTP message to the TSU with necessary information. The TSU then waits to get a timestamp from a High Accuracy Timestamp Assist (HATA)

device, as shown in item 715. In item 720, the HATA device detects a Start Frame Delimiter (SFD) pattern, and uses the SFD to generate a timestamp. In item 725, the TSU receives the timestamp from the HATA device and processes the timestamp.

In the reception path (RX) shown in FIG. 7B, the HATA device detects the SFD pattern, as shown in item 730. As shown in item 735, the MAC device reports the PTP message to the TSU with necessary information. At this point, the TSU waits to get the timestamp from the HATA device, as shown in item 740. In item 745, the HATA device detects the SFD pattern, and uses the SFD to generate a timestamp. In item 750, the TSU receives the timestamp from the HATA device and processes the timestamp.

Since the HATA device 271 gets the arrival time of the scrambled SFD bit pattern of the PTP message at the SerDes interface 549, most time uncertainties to timestamp generation may be ignored, including time uncertainties in the MAC Layer 542 and the Ethernet IPs, is the Forward Error Correction 547, Descrambler 545, and Decoding protocols. The remaining time uncertainty arises from the timestamp indication, CAPTURED_TS_PS 440 or 690, of clock domain crossing. This signal is used to indicate timestamp generation and may be generated by the logic in the System Clock domain, so to use System Clock to sample CAPTURED_TS_PS 440 or 690 may introduce, at most, a one cycle SYS_CLK delay. In this case, the HATA device may subtract 1½ of the SYS_CLK cycle to compensate for the sample delay. Assuming a 1 GHz system clock to sample the timestamp indication signal from the SerDes clock domain the maximum sample delay will be one nanosecond—after compensating for the by the ½ SYS_CLK cycle, the sample delay will be 0.5 nanoseconds. Considering the sample delays on both the TX and RX paths, the round trip sample delay can be as low as one nanosecond.

An exemplary embodiment may be a communication device and/or a method for synchronizing clocks in a network. Thus, as shown in flowchart form in FIG. 8, generic methods herein use a time protocol decoder of a timestamp synchronization unit to detect a time protocol message being transmitted on a transmission medium in item 800. The time protocol decoder is connected to the transmission medium through a physical layer, and the physical layer includes a scrambler/descrambler. The methods herein detect the time protocol message in output from the scrambler/descrambler in item 802. Also, these methods use a clock connection of the timestamp synchronization unit to receive a clock signal from an external clock signal control unit in item 804.

As shown in item 806, such methods can identify a start frame delimiter of the time protocol message (e.g., using a processor of the timestamp synchronization unit) by matching patterns in the time protocol message to known start frame delimiter patterns. The physical layer includes a serializer/deserializer, and these methods identify the start frame delimiter on output from the serializer/deserializer in item 806. Additionally, these methods use the processor to capture a "clock time" at which the start frame delimiter is identified in item 808 (e.g., by referring to the clock signal during the process of identifying the start frame delimiter).

As shown in item 810, such methods perform compensation of the clock time by making adjustments to the clock time for known time latency, using the processor. This known time latency used in item 810 is the sum of bit offsets of the serializer/deserializer combined with latency caused by traversing the synchronization unit. This allows the methods herein to output the compensated clock time from the timestamp synchronization unit to a timestamp unit, as a timestamp in item 812. Further, the timestamp unit is connected to a medium access control device, and the medium access control device provides the time protocol message to the timestamp unit. With methods herein, the timestamp unit waits until the timestamp synchronization unit outputs the timestamp in item 812 before outputting the same as its own timestamp in item 814.

Figure 9:
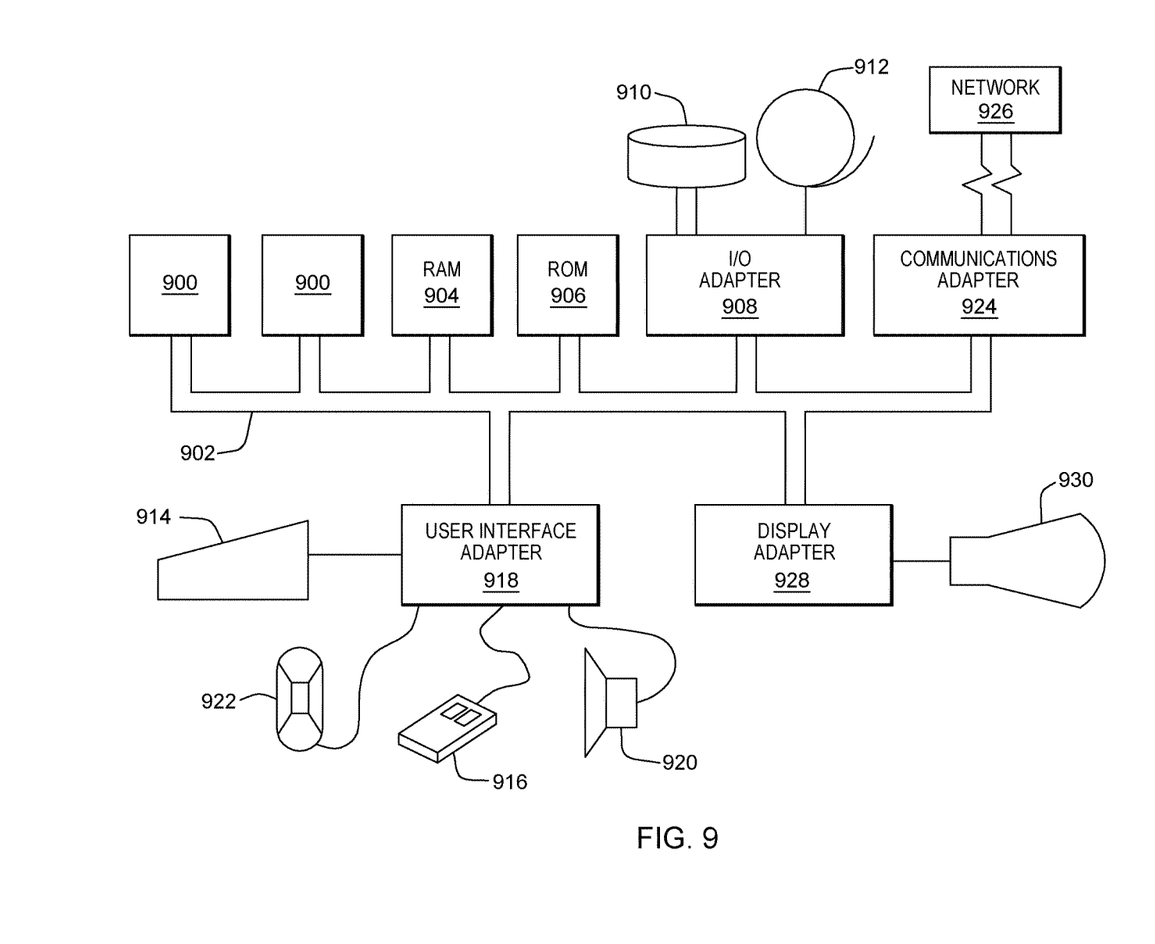
FIG. 9 is a schematic diagram illustrating a representative hardware environment for implementing the embodiments disclosed herein.

A representative hardware environment (i.e., a computer system) for implementing the systems, methods and computer program products disclosed above is depicted in FIG. 9. This schematic drawing illustrates a hardware configuration of an information handling/computer system in accordance with the embodiments herein. The system incorporates at least one processor or central processing unit (CPU) 900. The CPUs 900 are interconnected via a system bus 902 to various devices such as a random access memory (RAM) 904, read-only memory (ROM) 906, and an input/output (I/O) adapter 908. The I/O adapter 908 can connect to peripheral devices, such as disk units 910 and tape drives 912, or other program storage devices that are readable by the system. The system can read the inventive instructions on the program storage devices and follow these instructions to execute the methodology of the embodiments herein. The system further includes a user interface adapter 918 that connects a keyboard 914, mouse 916, speaker 920, microphone 922, and/or other user interface devices such as a touch screen device (not shown) to the bus 902 to gather user input. Additionally, a communication adapter 924 connects the bus 902 to a data processing network 926, and a display adapter 928 connects the bus 902 to a display device 930 which may be embodied as an output device such as a monitor, printer, or transmitter, for example.

The flowchart and block diagrams in the figures illustrate the architecture, functionality, and operation of possible implementations of devices and methods according to various embodiments. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the foregoing. As used herein, the singular forms "a," "an," and "the" are intended to include the plural forms as well, unless the context clearly indicates otherwise.

Each respective figure, in addition to illustrating methods of and functionality of the present embodiments at various stages, also illustrates the logic of the method as implemented, in whole or in part, by one or more devices and structures. Such devices and structures are configured to (i.e., include one or more components, such as resistors, capacitors, transistors and the like that are connected to enable the performing of a process) implement the method of merging one or more non-transactional stores and one or more thread-specific transactional stores into one or more cache line templates in a store buffer in a store cache. In other words, one or more computer hardware devices can be created that are configured to implement the method and processes described herein with reference to the Figures and their corresponding descriptions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiment, the practical application or technical improvement over technologies found in the marketplace, or to enable other of ordinary skill in the art to understand the embodiments disclosed herein.

Embodiments herein may be used in a variety of electronic applications, including but not limited to advanced sensors, memory/data storage, semiconductors, microprocessors and other applications. A resulting device and structure, such as an integrated circuit (IC) chip can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the embodiments in the form disclosed. Many modifications and variations will be apparent to those of ordinary skill in the art without departing from the scope and spirit of the embodiments herein. The embodiments were chosen and described in order to best explain the principles of such, and the practical application, and to enable others of ordinary skill in the art to understand the various embodiments with various modifications as are suited to the particular use contemplated.

While the foregoing has been described in detail in connection with only a limited number of embodiments, it should be readily understood that the embodiments herein are not limited to such disclosure. Rather, the elements herein can be modified to incorporate any number of variations, alterations, substitutions or equivalent arrangements not heretofore described, but which are commensurate with the spirit and scope herein. Additionally, while various embodiments have been described, it is to be understood that aspects herein may be included by only some of the described embodiments. Accordingly, the claims below are not to be seen as limited by the foregoing description. A reference to an element in the singular is not intended to mean "one and only one" unless specifically stated, but rather "one or more." All structural and functional equivalents to the elements of the various embodiments described throughout this disclosure that are known or later, come to be known, to those of ordinary skill in the art are expressly incorporated herein by reference and intended to be encompassed by this disclosure. It is therefore to be understood that changes may be made in the particular embodiments disclosed which are within the scope of the foregoing as outlined by the appended claims.

What is claimed is:

1. A synchronization method comprising:
   detecting, by a time protocol decoder of a synchronization unit, a time protocol message being transmitted on a transmission medium;
   receiving, by a clock connection of said synchronization unit, a clock signal from an external clock signal control unit;
   identifying, by a processor of said synchronization unit, a start frame delimiter of said time protocol message by matching patterns in said time protocol message to known start frame delimiter patterns;
   capturing, by said processor, a clock time at which said start frame delimiter is identified by referring to said clock signal during said identifying of said start frame delimiter; and
   outputting, from said synchronization unit to a timestamp unit, said clock time as a timestamp.

2. The synchronization method according to claim 1, said time protocol decoder is connected to said transmission medium through a physical layer, said physical layer includes a serializer/deserializer, and said identifying identifies said start frame delimiter on output from said serializer/deserializer.

3. The synchronization method according to claim 1, said time protocol decoder is connected to said transmission medium through a physical layer, said physical layer includes a scrambler/descramber, and said detecting detects said time protocol message in output from said scrambler/descramber.

4. The synchronization method according to claim 1, further comprising performing compensation of said clock time by making adjustments to said clock time for known time latency, using said processor.

5. The synchronization method according to claim 4, said time protocol decoder is connected to said transmission medium through a physical layer, said physical layer includes a serializer/deserializer, and
   said known time latency comprises bit offsets of said serializer/deserializer combined with latency caused by traversing said synchronization unit.

6. The synchronization method according to claim 1, said timestamp unit is connected to a medium access control device, said medium access control device provides said time protocol message to said timestamp unit, and said timestamp unit waits until said processor outputs said timestamp before outputting said timestamp.

7. A synchronization unit comprising:
   a clock connection connected to an external clock signal control unit, said clock connection receives a clock signal from said external clock signal control unit;
   a timestamp unit connection connected to an external timestamp unit;
   a time protocol decoder connected to a transmission medium, said time protocol decoder decodes a time protocol message being transmitted on said transmission medium; and a processor electrically connected to said clock connection, said timestamp unit connection, and said time protocol decoder, said processor identifies a start frame delimiter of said time protocol message by matching patterns in said time protocol message to known start frame delimiter patterns, said processor captures a clock time at which said start frame delimiter is identified by referring to said clock signal while identifying said start frame delimiter, and said processor outputs said clock time as a timestamp to said timestamp unit through said timestamp unit connection.

8. The synchronization unit according to claim 7, said time protocol decoder is connected to said transmission medium through a physical layer, said physical layer includes a serializer/deserializer, and said processor identifies said start frame delimiter in output from said serializer/deserializer.

9. The synchronization unit according to claim 7, said time protocol decoder is connected to said transmission medium through a physical layer, said physical layer includes a scrambler/descramber, and said time protocol decoder decodes said time protocol message in output from said scrambler/descramber.

10. The synchronization unit according to claim 7, said processor performs compensation of said clock time by making adjustments to said clock time for known time latency.

11. The synchronization unit according to claim 10, said time protocol decoder is connected to said transmission medium through a physical layer, said physical layer includes a serializer/deserializer, and said known time latency comprises bit offsets of said serializer/deserializer combined with latency caused by traversing said synchronization unit.

12. The synchronization unit according to claim 7, said timestamp unit is connected to a medium access control device, said medium access control device provides said time protocol message to said timestamp unit, and said timestamp unit waits until said processor outputs said timestamp before outputting said timestamp.

13. The synchronization unit according to claim 7, said transmission medium comprises an Ethernet medium.

14. A synchronization system comprising:
a master node synchronization unit electrically connected to: a transmission medium; a master node clock signal control unit generating a master node clock signal; and a master node timestamp unit; and
a slave node synchronization unit electrically connected to: said transmission medium; a slave node clock signal control unit generating a slave node clock signal; and a slave node timestamp unit,
said master node synchronization unit identifies a master node start frame delimiter of a time protocol message on said transmission medium by matching patterns in said time protocol message to known start frame delimiter patterns,
said slave node synchronization unit identifies a slave node start frame delimiter of said time protocol message on said transmission medium by matching said patterns in said time protocol message to said known start frame delimiter patterns,
said master node synchronization unit captures a master node clock time at which said master node start frame delimiter is identified by referring to said master node clock signal while identifying said master node start frame delimiter,
said slave node synchronization unit captures a slave node clock time at which said slave node start frame delimiter is identified by referring to said slave node clock signal while identifying said slave node start frame delimiter,
said master node synchronization unit outputs said master node clock time as a master node timestamp to said master node timestamp unit, and
said slave node synchronization unit outputs said slave node clock time as a slave node timestamp to said slave node timestamp unit.

15. The synchronization system according to claim 14, said master node synchronization unit and said slave node synchronization unit are connected to said transmission medium through a physical layer, said physical layer includes a serializer/deserializer, and said master node synchronization unit identifies said master node start frame delimiter in output from said serializer/deserializer, and said physical layer includes a serializer/deserializer, and said slave node synchronization unit identifies said slave node start frame delimiter in output from said serializer/deserializer.

16. The synchronization system according to claim 14, said master node synchronization unit and said slave node synchronization unit are connected to said transmission medium through a physical layer, said physical layer includes a scrambler/descramber, and said master node time protocol decoder decodes said time protocol message in output from said scrambler/descramber, and said physical layer includes a scrambler/descramber, and said slave node time protocol decoder decodes said time protocol message in output from said scrambler/descramber.

17. The synchronization system according to claim 14, said master node synchronization unit performs compensation of said master node clock time by making adjustments to said master node clock time for known time latency, and said slave node synchronization unit performs compensation of said slave node clock time by making adjustments to said slave node clock time for said known time latency.

18. The synchronization system according to claim 17, said master node synchronization unit and said slave node synchronization unit are connected to said transmission medium through a physical layer, said physical layer includes a serializer/deserializer, and said known time latency comprises bit offsets of said serializer/deserializer combined with latency caused by traversing said synchronization system.

19. The synchronization system according to claim 14, said master node timestamp unit is connected to a master node medium access control device, said slave node timestamp unit is connected to a slave node medium access control device, said master node medium access control device provides said time protocol message to said master node timestamp unit, said slave node medium access control device provides said time protocol message to said slave node timestamp unit, said master node timestamp unit waits until said master node synchronization unit outputs said timestamp before outputting said timestamp, and said slave node timestamp unit waits until said slave node synchronization unit outputs said timestamp before outputting said timestamp.

20. The synchronization system according to claim 14, said transmission medium comprises an Ethernet medium.

* * * * *